Jan. 13, 1970          E. LESH          3,488,844
           EDGED LAMINATED CUTTING TOOL
              Filed July 28, 1967

INVENTOR
Ed Lesh

United States Patent Office 3,488,844
Patented Jan. 13, 1970

3,488,844
EDGED LAMINATED CUTTING TOOL
Ed Lesh, 1337 Woods Run Ave., Pittsburgh, Pa. 15212
Filed July 28, 1967, Ser. No. 656,744
Int. Cl. B26b 9/00; B25b 3/00; B21b 25/00
U.S. Cl. 30—350
3 Claims

ABSTRACT OF THE DISCLOSURE

As edged cutting tool is provided having a laminated blade made up of an inner layer of Carboloy alloy with beryllium and diamantine sandwiched between two layers of a beryllium containing alloy such as steel or copper.

---

Our system has to do with a need for a tough cutting edge that can cut even a diamond with the diamantine added to the cemented carbides, sold under the name trademark Carboloy, beryllium alloy.

With present day systems, electric wires, conduits, etc., can present quite a hazard when working with tools. This alloy will cut through alive electric wires, etc., and save a person's life. The possibility of tool breakage in edge tools and resulting down time is lessened.

This invention relates to edged cutting tools and particularly to an edged cutting tool made up of a laminate of Carboloy alloy containing beryllium and diamantine sandwiched between two layers of a beryllium containing metal such as steel or copper. Preferably the cutting tool is carried in a removable handle so that the blade can be changed if the edge is lost or broken.

The Swedes and Norwegians have used a sandwich of metal for knife blades for a hundred years or more. However, their sandwich consists of a soft iron sandwiching a tough steel. This gave them a combination of a soft flexibility and tough brittle metal. The soft iron saved the knife from breaking. They would need something of this sort to offset the winter cold which makes metal extremely brittle.

Our system, however, has to do with a need for a tough cutting edge that can cut even a diamond with the diamantine added to the Carboloy alloy. With present day systems, electric wires, conduits, etc., can present quite a hazard when working with tools. The addition of beryllium not only strengthens the metal alloys, it makes them neutral to all electric contact. The saw blades are very handy since if one desired they could be used in coping saws of various types available on the market. The two cutting edges work without harming the others set because the cerf is the same width.

When two saw blades are mounted side by side the wider cerf allows blades to saw right on through material the same as a carpenter's saw, etc. Two saw blades together have a wider cerf than back of knife blade.

Figure 1:
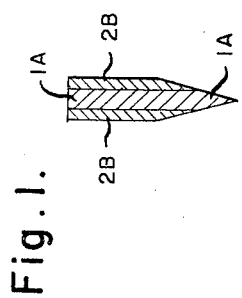
FIGURE 1 is a section through a cutting blade according to this invention.

Referring to the drawings, I have illustrated a cutting blade having a center laminate 1A of Carboloy with beryllium and diamantine added and sandwiched between two outer layers 2B of stainless steel containing beryllium. The outer layers may be ordinary steel with beryllium or copper with beryllium.

Figure 2:
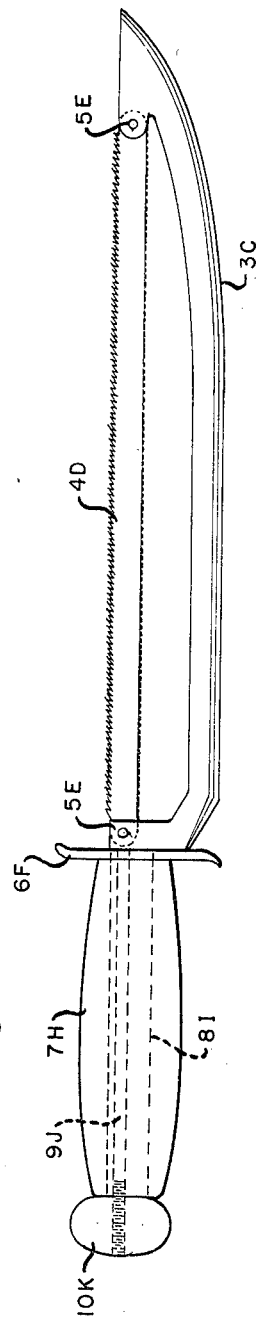
FIGURE 2 is a side elevation of a cutting tool embodying the cutting edge of this invention.

In FIGURE 2 I have illustrated an edged tool made up of an edged blade 3C and a serrated blade 4D similar to a saw blade. Both blades 3C and 4D are constructed as illustrated in FIGURE 1 with a center laminate to Carboloy with beryllium and diamantine and outer layers of beryllium steel or copper. The two blades are connected at their ends by hooks and rivets 5E at their ends. A guard 6F separates the blade and hilt 7H which is preferably made of fiber glass woven cloth rings set in epoxy resin. The hilt 7H is provided with a tang passage 8I through which tang rod 9J extends from the blade to the pummel 10K. The tang rod 9J is threaded at one end to receive the pummel 10K and is connected at the other end to the blade members 3C and 4D. The pummel 10K is preferably made of fiber glass and rigid epoxy resin around a steel threaded socket embedded into pummel to allow the tang rod to tighten and to thus lock knife blade, saw blade, knife hilt together. Can make a double pummel not illustrated. Bottom pummel would fasten knife tang and hilt together, top pummel would fasten saw blade into place by tightening the tang rod only. Can be used as desired or needed.

Scabbard, not illustrated, should be made of fiber glass cloth with flexible epoxy resin. However, scabbard material can be as desired or needed. The scabbard should have a separate pouch, scabbard or holster on it to hold extra saw blades, different sizes or same set as needed. It should have a little pouch to hold the whethstone or hone. This to be made of diamantine and resin, epoxy resin, etc.

This system provides a measure of safety to the operator in dense brush trees growth. Instead of slashing and beating things to pieces, and possibly hanging your equipment or tool in a branch, twig, or glancing off of these these things and hurting the operator. Using the saw blade and a sawing motion, you can do a safer and neater job, save all kinds of strength as well.

I claim as my invention:
1. An edged cutting tool comprising a blade formed of a center laminate of Carboloy with beryllium and diamantine added sandwiched between two layers of a metal containing beryllium.
2. An edged cutting tool as claimed in claim 1 wherein the outer layers are beryllium steel.
3. An edged cutting tool as claimed in claim 1 wherein the outer layers are beryllium copper.

References Cited

UNITED STATES PATENTS

| | | | |
|---|---|---|---|
| 417,539 | 12/1889 | Bush | 30—144 |
| 1,388,014 | 8/1921 | Aiguier | 30—144 |
| 1,975,115 | 10/1934 | Masing | 75—150 X |
| 2,087,051 | 7/1937 | Stargardter | 30—346.54 |
| 2,335,249 | 11/1943 | Hawkins | 30—350 |
| 2,686,439 | 8/1954 | Tobert | 29—191.2 X |
| 2,792,624 | 5/1957 | Muller | 29—191.2 X |

ROBERT C. RIORDON, Primary Examiner

J. C. PETERS, Assistant Examiner

U.S. Cl. X.R.

29—194, 196.1; 30—144